(12) United States Patent
Takahashi

(10) Patent No.: US 8,355,569 B2
(45) Date of Patent: Jan. 15, 2013

(54) OBJECT REGION EXTRACTING DEVICE

(75) Inventor: Yusuke Takahashi, Tokyo (JP)

(73) Assignee: NEC Corporation, Tokyo (JP)

( * ) Notice: Subject to any disclaimer, the term of this patent is extended or adjusted under 35 U.S.C. 154(b) by 1018 days.

(21) Appl. No.: 12/309,925

(22) PCT Filed: Aug. 6, 2007

(86) PCT No.: PCT/JP2007/065336
§ 371 (c)(1),
(2), (4) Date: Feb. 3, 2009

(87) PCT Pub. No.: WO2008/018398
PCT Pub. Date: Feb. 14, 2008

(65) Prior Publication Data
US 2009/0304271 A1    Dec. 10, 2009

(30) Foreign Application Priority Data
Aug. 10, 2006    (JP) .................................. 2006-218535

(51) Int. Cl.
*G06K 9/34*    (2006.01)
*G06K 9/46*    (2006.01)
(52) U.S. Cl. ......... 382/165; 382/173; 382/190; 382/218
(58) Field of Classification Search .................. 382/173, 382/217, 218, 165, 190
See application file for complete search history.

(56) References Cited

U.S. PATENT DOCUMENTS 5,554,983 A *  9/1996  Kitamura et al. ............. 340/937
7,203,346 B2 *  4/2007  Kim et al. ..................... 382/118
2002/0030359 A1 *  3/2002  Bergenek et al. ............... 283/68
2003/0083850 A1 *  5/2003  Schmidt et al. ............... 702/189
2003/0099397 A1 *  5/2003  Matsugu et al. .............. 382/173

FOREIGN PATENT DOCUMENTS

JP    4-291472    10/1992
JP    9-231362    9/1997
(Continued)

OTHER PUBLICATIONS

Manjunath, B.S., et al., "Color and Texture Descriptors", IEEE Transactions on Circuits and Systems for Video Technology, vol. 11, No. 6, Jun. 2001, pp. 703-715.

(Continued)

*Primary Examiner* — Jon Chang
(74) *Attorney, Agent, or Firm* — McGinn IP Law Group, PLLC

(57) ABSTRACT

Region dividing means (3) divides an inputted image by color or edge. Partial feature value providing means (4) extracts visual feature values of the divided region. Area sorting means (5, 6) sorts the feature values of the divided regions and part feature values (32) which are visual features of the parts into which an object is divided in order of area of the region. Part matching means (7) selects the part feature value (32) which the region of the largest area has, selects a visual feature value which the divided region of the largest area has out of the divided regions whose similarities are not calculated, calculates the similarity of the selected visual feature value, and extracts candidate regions. If the visual feature value of the joined region formed by combining the candidate regions is similar to the visual feature value of the whole object stored in storage means (2), the joined region is treated as a region similar to the object.

15 Claims, 8 Drawing Sheets

FOREIGN PATENT DOCUMENTS

| | | |
|---|---|---|
| JP | 2002-245048 | 8/2002 |
| JP | 2005-4612 | 1/2005 |
| JP | 2005-149323 | 6/2005 |

OTHER PUBLICATIONS

Manjunath, B.S., et al., "Introduction to MPEG-7 Multimedia Content Description Interface", Shape Descriptors, 2002, John Wiley & Sons, Ltd., pp. 138-141.

Hirata, Kyoji, et al., "On Image Segmentation for Object-based Image Retrieval", 2002 Proceedings 16th International Conference on Pattern Recognition, vol. 3, 2002, pp. 1031-1034.

Takahashi, Yusuke, et al., "Sky Region Detection Based on Object Component Dictionary", 2006 Proceedings of IEICE, vol. 2006, Information System 2, p. 163.

* cited by examiner (a)

(b)

(a)

(b)

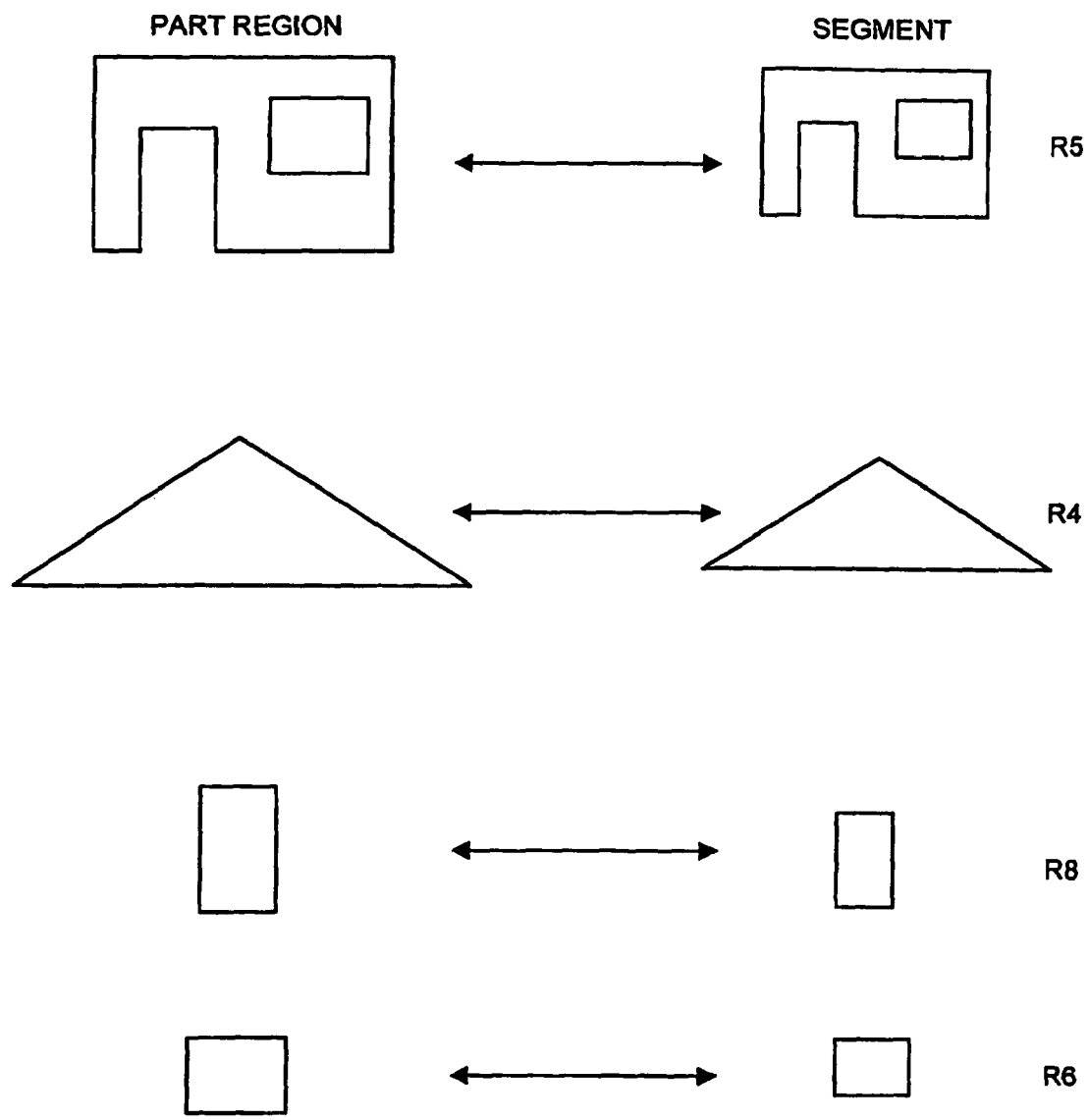

OBJECT REGION EXTRACTING DEVICE

TECHNICAL FIELD

The present invention relates to an object region extracting apparatus, an object region extracting method, and an object region extracting program for extracting a region similar to a specific object from an input image.

Background Art

There have been proposed object identifying apparatuses for automatically identifying the type of an object contained in an image. Patent Document 1 discloses an image searching apparatus for searching for an image that is similar to an input search key image. The image searching apparatus disclosed in Patent Document 1 divides an image into a plurality of regions based on parameters including color, a texture or the like, compares the feature quantity of each image region with the feature quantity of the search key image, and identifies an image region that is similar to the search key image. Patent Document 1 also discloses registering the feature quantity of a rectangular region containing an object region and the feature quantity of the object region into a database.

Patent Document 2 discloses an image recognizing apparatus for applying edge detection or the like to input image data and extracting a partial region for storage. Patent Document 2 discloses storing data relating to features such as a shape, a size, a position, and the like, of each partial region of a model (e.g., of each partial region representing an eye, a nose, a mouth or the like) of a specific physical object, and also storing data relating to a feature such as a connection relationship between these regions. Moreover, it discloses calculating the degree of similarity between a partial region in the input image and a partial region of the model, and matching the object to be recognized with the model.

Patent Document 3 discloses an appearance examination apparatus for examining a difference in color, stain or defect of letters, or out-of-register print for containers, caps or the like. The appearance examination apparatus disclosed in Patent Document 3 sorts connection patterns of interest in order of area, and compares the area of each pattern with that of a reference pattern. Patent Document 3 teaches that judgment as to whether the pattern of interest matches the reference pattern can be precisely achieved because the area of the pattern is unchanged even when the pattern is rotated or shifted.

Non-patent Document 1 discloses a sky region extracting scheme that registers blue sky regions and cloud regions as parts into a sky object dictionary, divides an image into segments based on a visual feature, and matches a combination of a plurality of segments with the parts. Non-patent Document 1 teaches that a dictionary is employed in which the visual feature quantity of each part obtained by dividing an object to have the same visual feature, and the visual feature quantity of the whole object are registered. Non-patent Document 1 discloses extracting a segment that is similar to a registered part from those in an input image, combining such segments to create a candidate segment, and matching the visual feature quantity of the candidate segment with that of the whole object, to thereby extract an object region.

Non-patent Document 2 discloses a method of segmentation. Non-patent Document 3 discloses determination of the feature quantity of a color or texture. Non-patent Document 4 discloses determination of the feature quantity of a shape.

[Patent Document 1] JP-P2002-245048A (in Paragraphs 0024, 0031)

[Patent Document 2] JP-P2005-4612A (in Paragraphs 0115-0124)

[Patent Document 3] JP-P1997-231362A (in Paragraph 0023)

[Non-patent Document 1] Yusuke TAKAHASHI, Kyoji HIRATA, "Detection of Sky Region based on Object Construction Dictionary," 2006 Proceedings of IEICE, Vol. 2006, Information System 2, p.163

[Non-patent Document 2] Kyoji HIRATA, Eiji KASUTANI, and Yoshinori HARA, "On Image Segmentation for Object-based Image Retrieval," 2002 Proceedings 16$^{th}$ International Conference on Pattern Recognition, Vol. 3, 2002, pp. 1031-1034

[Non-patent Document 3] B. S. Manjunath, Jens-Rainer Ohm, Vinod V. Vasudevan, and Akio YAMADA, "Color and Texture Descriptor," IEEE Transactions on Circuits and Systems for Video Technology, Vol. 11, No. 6, June 2001, pp. 703-715

[Non-patent Document 4] S. Manjunath, Phillippe Salembier, and Thomas Sikora, "Introduction to MPEG-7 Multimedia Content Description Interface," John Wiley & Sons, Ltd., pp. 138-141

DISCLOSURE OF THE INVENTION

Problems to be Solved by the Invention

In the scheme disclosed in Patent Document 1, however, an object is not registered as a collection of components (parts). Therefore, it is not possible to extract an object region based on a combination of a plurality of segments in an input image.

In the scheme disclosed in Patent Document 2, the whole object is recognized according to the mutual positional relationship between the matched partial regions. Specifically, the degree of similarity of the mutual positional relationships between partial regions is calculated, and recognition as to whether a physical object represented by a model matches the input image is made based on the result of calculation. Therefore, the technique is merely applicable to a case in which there is no significant difference in the mutual positional relationship between partial regions, as in a face of a person.

Moreover, by combining the methods disclosed in Patent Documents 1, 2 and Non-patent Document 1, it is possible to extract an object region by dividing an input image into a plurality of segments, determining the degree of similarity between the feature quantity of each segment and the feature quantity of each part registered in a dictionary, and also determining the degree of similarity between the feature quantity of a combined region obtained by combining similar segments (sometimes referred to as candidate segments) and the feature quantity of the whole object.

However, the processing of determining the degree of similarity between the feature quantity of each segment and the feature quantity of each part, and the processing of determining the degree of similarity between the feature quantity of a combined region and the feature quantity of the whole object are both iterative processes with a heavy processing load. Moreover, the number of runs of the processing of determining the degree of similarity between the feature quantity of a combined region and the feature quantity of the whole object increases accompanied with an increasing processing load as the number of combinations in combining candidate segments increases. Furthermore, since input to the dictionary is achieved by a manual operation of registering regions, improvement of efficiency of the input operation is a challenge.

In the scheme disclosed in Patent Document 3, connection patterns and reference patterns are sorted in order of area, and thereafter, determination of the degree of similarity between a connection pattern and a reference pattern is made using the feature quantity of area as a feature quantity that is invariable with rotation or noise. Therefore, when the area of the reference pattern is not similar to that of the connection pattern, they are recognized as non-similar patterns. For example, a certain pattern and its enlargement are recognized as non-similar patterns.

It is therefore an object of the present invention to provide an object region extracting apparatus, an object region extracting method and an object region extracting program capable of extracting a region similar to a specific object from an image such as a still image or a video image, and efficiently performing region extracting processing.

Means for Solving the Problems

An object region extracting apparatus according to the present invention is characterized in that the apparatus includes: storage means for storing a visual feature quantity of a whole region of a specific object, and a visual feature quantity of each of partial regions obtained by dividing the object so that each partial region has a similar visual feature; region dividing means for dividing an input image into segments each having a similar visual feature; partial feature quantity extracting means for extracting a visual feature quantity of each of the divided segments; partial matching means for calculating a degree of similarity between the visual feature quantity of the partial region and the visual feature quantity of the segment, performing partial matching processing that decides whether or not the calculated degree of similarity has a predetermined relationship with a first threshold, and if they have the predetermined relationship, defining the segment as a candidate segment constituting a portion of the specific object; whole feature quantity extracting means for producing a combined region constituted by combining the candidate segments, and extracting a visual feature quantity of the produced combined region; and whole matching means for calculating a degree of similarity between the visual feature quantity of the whole region and the visual feature quantity of the combined region, and deciding that the combined region is a region similar to the specific object when the calculated degree of similarity and a second threshold fulfill a predetermined relationship, wherein the partial matching means performs the partial matching processing by selecting a visual feature quantity of each of the partial regions and the segments in a descending order of an area thereof, which are acquired along with the visual feature quantity, and selecting a visual feature quantity of a partial region having a next smaller area when the candidate segment is detected, and selecting a visual feature quantity of a segment having a next smaller area when the candidate segment is not detected.

The partial matching means may use at least one of a feature quantity relating to color, a feature quantity relating to a texture, a feature quantity relating to a size, and a feature quantity relating to a position to calculate a degree of similarity between the visual feature quantity of the partial region stored in the storage means and the visual feature quantity extracted by the partial feature quantity extracting means.

The whole matching means may use at least one of a feature quantity relating to color, a feature quantity relating to a texture, a feature quantity relating to a shape, a feature quantity relating to a size, and a feature quantity relating to a position to calculate a degree of similarity between the visual feature quantity of the whole region stored in the storage means and the visual feature quantity extracted by the whole feature quantity extracting means.

The aforementioned apparatus may include registering means for registering the visual feature quantity of the combined region extracted by the whole feature quantity extracting means into the storage means as a visual feature quantity of the whole region of the object, and registering the visual feature quantity of the candidate segment matched by the partial matching means into the storage means as a visual feature quantity of each partial region. According to such a configuration, the visual feature quantity of the whole region and the visual feature quantity of the partial region of an object can be efficiently registered.

An object region extracting method according to the present invention is one of extracting a region similar to a specific object from an input image using a visual feature quantity of a whole region of the specific object, and a visual feature quantity of each of partial regions obtained by dividing the object so that each partial region has a similar visual feature, which is stored in storage means, characterized in that the method includes: dividing the input image into segments each having a similar visual feature; extracting a visual feature quantity of each of the divided segments; calculating a degree of similarity between the visual feature quantity of the partial region and the visual feature quantity of the segment by selecting a visual feature quantity of each of the partial regions and the segments in a descending order of an area thereof, which are acquired along with the visual feature quantity, and selecting a visual feature quantity of a partial region having a next smaller area when the candidate segment is detected, and selecting a visual feature quantity of a segment having a next smaller area when the candidate segment is not detected; deciding whether or not the calculated degree of similarity has a predetermined relationship with a first threshold, and if they have the predetermined relationship, defining the segment as a candidate segment constituting a portion of the specific object; producing a combined region constituted by combining the candidate segments, and extracting a visual feature quantity of the produced combined region; and calculating a degree of similarity between the visual feature quantity of the whole region and the visual feature quantity of the combined region, and deciding that the combined region is a region similar to the specific object when the calculated degree of similarity and a second threshold fulfill a predetermined relationship.

The degree of similarity between the visual feature quantity of the partial region and the extracted visual feature quantity may be calculated using at least one of a feature quantity relating to color, a feature quantity relating to a texture, a feature quantity relating to a size, and a feature quantity relating to a position.

The degree of similarity between the visual feature quantity of the whole region and the extracted visual feature quantity may be calculated using at least one of a feature quantity relating to color, a feature quantity relating to a texture, a feature quantity relating to a shape, a feature quantity relating to a size, and a feature quantity relating to a position.

The aforementioned method may include registering the extracted visual feature quantity of the combined region into the storage means as a visual feature quantity of the whole region of the object, and registering the visual feature quantity of the matched candidate segment into the storage means as a visual feature quantity of each partial region. According to such a configuration, the visual feature quantity of the whole region and the visual feature quantity of the partial region of an object can be efficiently registered.

An object region extracting program according to the present invention is one for extracting a region similar to a specific object from an input image using a visual feature quantity of a whole region of the specific object, and a visual feature quantity of each of partial regions obtained by dividing the object so that each partial region has a similar visual feature, characterized in that the object region extracting program causes a computer to execute: partial feature quantity extracting processing for dividing the input image into segments each having a similar visual feature and extracting a visual feature quantity of each of the divided segments; partial matching processing for calculating a degree of similarity between the visual feature quantity of the partial region and the visual feature quantity of the segment by selecting a visual feature quantity of each of the partial regions and the segments in a descending order of an area thereof, which are acquired along with the visual feature quantity, and selecting a visual feature quantity of a partial region having a next smaller area when the candidate segment is detected, and selecting a visual feature quantity of a segment having a next smaller area when the candidate segment is not detected, deciding whether or not the calculated degree of similarity has a predetermined relationship with a first threshold, and if they have the predetermined relationship, defining the segment as a candidate segment constituting a portion of the specific object; whole feature quantity extracting processing for producing a combined region constituted by combining the candidate segments, and extracting a visual feature quantity of the produced combined region; and whole matching processing for calculating a degree of similarity between the visual feature quantity of the whole region and the visual feature quantity of the combined region, and deciding that the combined region is a region similar to the specific object when the calculated degree of similarity and a second threshold fulfill a predetermined relationship.

One preferred mode of the object region extracting apparatus in accordance with the present invention is characterized in that the apparatus includes, for example: storage means for storing a set of visual feature quantities of a whole image and its partial regions of an object to be recognized, as dictionary data; region dividing means for dividing an input image into one or more segments; feature quantity extracting means for extracting a visual feature quantity of each segment; area sorting means for sorting the feature quantities in order of area of the segments divided by the region dividing means and the partial regions registered in the storage means; partial matching means for calculating a degree of similarity between the visual feature quantity of the partial region stored in the storage means and the visual feature quantity from the feature quantity extracting means in order of area, the visual feature quantities being obtained by the area sorting means, and if the calculated degree of similarity and a first threshold have a predetermined relationship, defining a segment corresponding to the visual feature quantity extracted by the feature quantity extracting means as a candidate segment constituting a portion of the object; whole matching means for calculating a degree of similarity between a feature quantity and the whole feature quantity stored in the storage means; and deciding means for deciding whether the combined region is the object of interest or not using the degree of similarity.

Effects of the Invention

According to the present invention, the number of runs of processing of calculating the degree of similarity can be reduced, and even when the number of partial regions obtained by dividing an object of interest for region extraction is increases, the processing of extracting a region similar to the object can be efficiently achieved.

BRIEF DESCRIPTION OF THE DRAWINGS

FIG. 8 An explanatory diagram showing an example of a segment defined to be a candidate of a part region.

| [EXPLANATION OF SYMBOLS] | |
|---|---|
| 1 | Image acquiring means |
| 2 | Storage means |
| 3 | Region dividing means |
| 4 | Partial feature quantity extracting means |
| 5, 6 | Area sorting means |
| 7 | Partial matching means |
| 8 | Whole feature quantity extracting means |
| 9 | Whole matching means |
| 10 | Deciding means |
| 11 | Registering means |

BEST MODES FOR CARRYING OUT THE INVENTION

Figure 1:
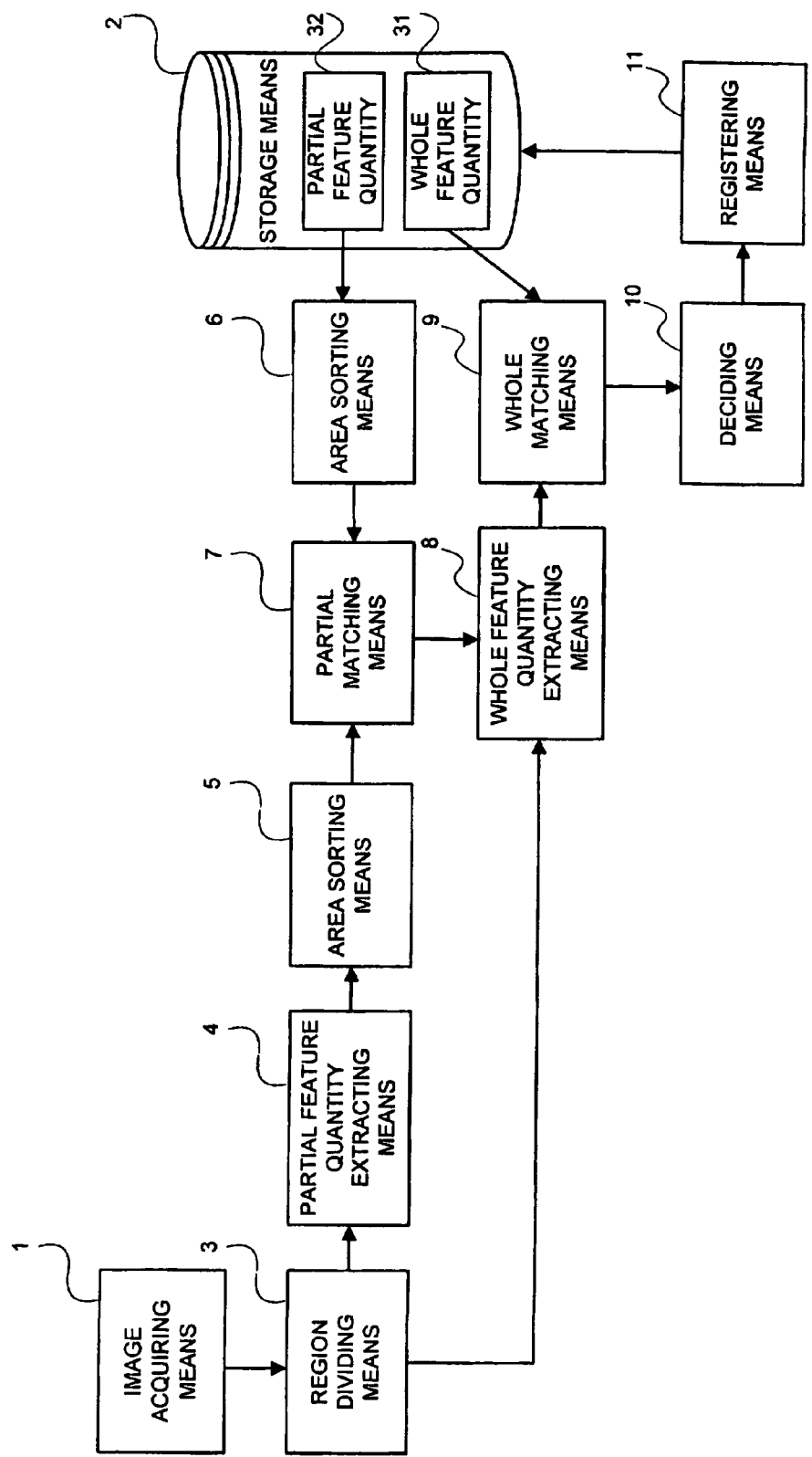
FIG. 1 A block diagram showing an embodiment of an object region extracting apparatus in accordance with the present invention.

An embodiment of the present invention will now be described with reference to the accompanying drawings. FIG. 1 is a block diagram showing an embodiment of an object region extracting apparatus in accordance with the present invention. The object region extracting apparatus in accordance with the present invention includes image acquiring means 1, storage means 2, region dividing means 3, partial feature quantity extracting means 4, area sorting means 5, area sorting means 6, partial matching means 7, whole feature quantity extracting means 8, whole matching means 9, deciding means 10, and registering means 11.

The image acquiring means 1 takes an image, and outputs the taken image to the region dividing means 3. The image acquiring means 1 is implemented by, for example, a CCD camera. Alternatively, the image acquiring means 1 may be an input device to which an image that was previously taken is input, rather than taking an image by itself.

The object region extracting apparatus in accordance with the present invention extracts, if any region similar to a specific object exists in an image, the region similar to that object from the image. The image taken by the image acquiring means 1 is one for which decision is made as to whether or not a region similar to a specific object exists therein. The image taken by the image acquiring means 1 may be either a still image or a video. The object refers to an imaged object contained in the image.

The region dividing means 3 divides a whole region represented by the image supplied by the image acquiring means 1 into a plurality of sub-regions based on a visual feature (e.g., color or an edge). Such division of an image into a plurality of sub-regions will be referred to as segmentation. Also, the divided sub-regions will be referred to as segments hereinbelow.

The partial feature quantity extracting means 4 extracts a visual feature quantity of a segment. Visual feature quantities may include, for example, a feature quantity of color, a feature quantity of a texture, a feature quantity of a shape, a feature quantity of a size or the like. The partial feature quantity extracting means 4 may extract a part or all of these feature quantities in a segment. Moreover, other feature quantities may be extracted.

The storage means 2 is a storage device for storing information. The storage means 2 stores therein a visual feature quantity of a whole image of an object (whole feature quantity) 31, and a visual feature quantity of a portion constituting the object (partial feature quantity) 32. A region of a portion constituting the whole object will be referred to as a part. The part refers to a divided sub-region of the whole object such that it has a similar visual feature, and it does not always correspond to a particular construction of a physical object that is the object. The sub-regions each having a similar visual feature can be obtained by dividing the whole object according to a color or by an edge. Specifically, they are obtained by dividing the whole object with a border of color-coded regions, or dividing the image with a border of an edge in the object. Even if a physical object that is imaged includes components A and B, when the whole image of the object obtained in imaging has no edge serving as the border between the components A and B and the components A and B have the same color, then the regions corresponding to the components A and B represent one part. The storage means 2 stores therein the whole feature quantity 31 and partial feature quantities 32 in advance before deciding as to whether or not a region similar to a specific object exists in an image. The operation of storing the whole feature quantity 31 and partial feature quantities 32 in the storage means 2 will be discussed later.

The storage means 2 may store therein the whole feature quantity 31 and partial feature quantities 32 regarding a specific object for which decision is made as to whether or not a similar region exists in the image. It is assumed that when a region similar to a house exists in an image, the object region extracting apparatus in accordance with the present invention extracts the region from the image, for example. That is, a region similar to a house is assumed to be a region to be extracted. In this case, the storage means 2 stores therein a visual feature quantity 31 of a whole house object, and partial feature quantities 32 of portions (parts) constituting the house object.

Figure 2:
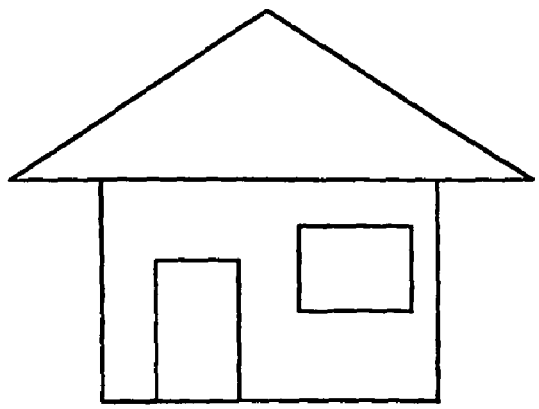
FIG. 2 An explanatory diagram showing a whole object and parts constituting the whole object.
Figure 2:
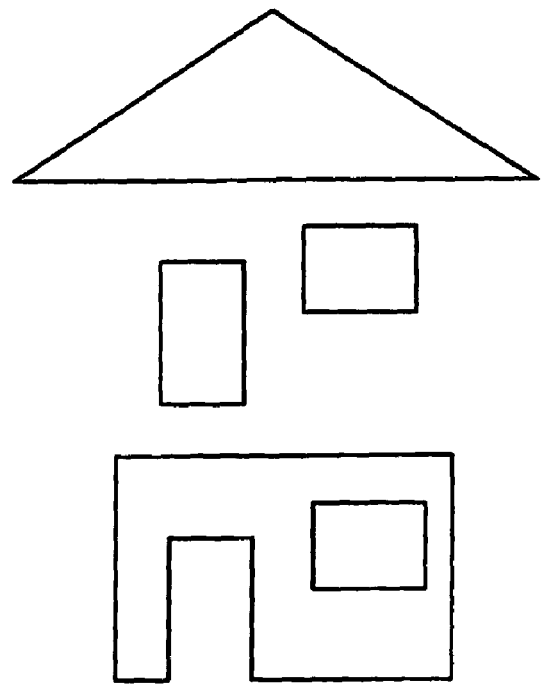

FIG. 2 is an explanatory diagram showing an object representing its entirety (whole object) and parts constituting the whole object. FIG. 2(*a*) exemplarily shows an object representing the whole house as the whole object. Four parts shown in FIG. 2(*b*) are portions obtained by dividing the whole object shown in FIG. 2(*a*) according to a visual feature (the present example illustrates the object divided by edges representing the border). In a case that a region similar to a house is a region to be extracted, the storage means 2 stores therein a visual feature quantity (whole feature quantity) 31 of the house as the whole object exemplarily shown in FIG. 2(*a*) and visual feature quantities (partial feature quantities) 32 of the parts exemplarily shown in FIG. 2(*b*).

Moreover, when the object region extracting apparatus extracts a region similar to a specific object, the storage means 2 may store therein not only a whole feature quantity and partial feature quantities for one image relating to the specific object but also whole feature quantities and partial feature quantities for a plurality of kinds of images regarding the specific object. For example, assume that a region similar to a house is a region to be extracted. In this case, the storage means 2 stores therein not only visual feature quantities of the whole object and its parts obtained by imaging the house in one direction but also visual feature quantities of the whole objects and their parts obtained by imaging the house in different directions.

For example, among the whole objects whose whole feature quantity is stored in the storage means 2, a j-th whole object is represented as Oj. Moreover, each whole object is divided into parts. A k-th part in the j-th whole object is represented as Ojk, for example. The storage means 2 stores therein the whole feature quantity and partial feature quantities correspondingly for each whole object to allow lookup of a whole feature quantity from a partial feature quantity as well as lookup of a partial feature quantity from a whole feature quantity. That is, the storage means 2 stores therein a set of a whole feature quantity of a whole object and partial feature quantities of parts of the whole object. The storage means 2 may also store therein the number of parts constituting the whole object (the number is denoted by v).

The visual feature quantity of a whole object and visual feature quantities of parts thereof stored in the storage means 2 are looked up as dictionary data.

The area sorting means 5 acquires a feature quantity of each segment from the partial feature quantity extracting means 4, and sorts the feature quantities in a descending order of area of the segments. Specifically, a feature quantity (e.g., feature quantity of color) of a segment is acquired corresponding to information representing the area of the segment (e.g., feature quantity of an area), and is sorted with a key of the information representing the area of the segment (e.g., feature quantity of an area). The area of a segment may be employed the number of picture elements (pixels) contained in the segment.

The area is extracted beforehand as a feature quantity of a segment. Alternatively, the extraction may be achieved by using the output of the region dividing means 3. When a feature quantity of a size (e.g., the number of pixels contained in a segment) that is extracted beforehand is employed as the area of a segment, for example, the area sorting means 5 acquires a feature quantity of each segment (e.g., feature quantity of color) corresponding to the feature quantity of a size, and sorts the segments in a descending order of the feature quantity of a size.

The area sorting means 6 reads the partial feature quantity 32 from the storage means 2, and sorts the read partial feature quantity 32 in a descending order of area of a region. That is, the partial feature quantity 32 (e.g., feature quantity of color) is acquired corresponding to information representing the area (e.g., feature quantity of an area) of the corresponding part, and is sorted with a key of the information representing the area (e.g., feature quantity of an area) of the part. The area of the part may be represented using the number of picture elements (pixels) contained in that region. The area is stored beforehand as a feature quantity of a region. In a case that the feature quantity of a size (e.g., the number of pixels contained in a part) that is extracted beforehand is employed for the area of a part, for example, the area sorting means 6 acquires the feature quantity (e.g., feature quantity of color) of each part corresponding to the feature quantity of a size, and sorts them in a descending order of the feature quantity of a size. Alternatively, the partial feature quantity 32 may be registered in the storage means 2 in a descending order of area beforehand, and read from the storage means 2 in a descending order of area.

The partial matching means 7 reads the partial feature quantity 32 from the area sorting means 6 in a descending order of area, and reads the visual feature quantity of each segment extracted by the partial feature quantity extracting means 4 from the area sorting means 5 in a descending order of area to decide similarity between these feature quantities.

Once the partial matching means 7 has read a partial feature quantity 32 having the largest area, it reads the visual feature quantity of each segment extracted by the partial feature quantity extracting means 4 from the area sorting means 5 in a descending order of area, and repeats similarity decision until similarity is decided to be higher than a standard.

If similarity is decided to be higher than a standard, the partial matching means 7 reads a partial feature quantity 32 having the next largest area from the area sorting means 6. Subsequently, the partial matching means 7 reads from the area sorting means 5 a visual feature quantity of the segment having the largest area from among those for which the degree of similarity has not calculated yet, and repeats similarity decision. Such decision of the degree of similarity is repeated until all partial feature quantities 32 are subjected to the decision.

The partial matching means 7 outputs information representing segments decided to have high similarity (which will be referred to as a candidate segment hereinbelow) to the whole feature quantity extracting means 8. The numeric value representing the degree of likeness is referred to as the degree of similarity herein. In the present embodiment, a smaller value of the degree of similarity represents higher likeness. Therefore, the degree of similarity equal to or smaller than a threshold refers to likeness higher than a standard. A method of calculating the degree of similarity will be discussed later.

Based on the information representing the candidate segment supplied by the partial matching means 7, the whole feature quantity extracting means 8 combines candidate segments using the result of extraction by the region dividing means 3, and extracts a visual feature quantity of the region obtained by the combination (which will be referred to as a combined region hereinbelow). That is, the whole feature quantity extracting means 8 produces an image before segmentation constituted by all candidate segments as the combined region.

The whole matching means 9 reads a whole feature quantity 31 from the storage means 2, and calculates similarity between the whole feature quantity 31 and the visual feature quantity of the combined region extracted by the whole feature quantity extracting means 7.

If the level of similarity calculated by the whole matching means 9 is higher than a standard (i.e., the degree of similarity in terms of a numeric value representing the degree of likeness is equal to or smaller than a threshold), the deciding means 10 defines the combined region as a region extracted from the image. It should be noted that in this embodiment, similarity is defined to be higher when the degree of similarity in terms of a numeric value representing the degree of likeness is smaller, and hence, similarity is higher than a standard when the degree of similarity is equal to or smaller than a threshold.

The registering means 11 registers the visual feature quantity of the combined region extracted by the whole feature quantity extracting means 8 output by the deciding means 10 and the visual feature quantities of the candidate segments matched by the partial matching means 7 as the whole feature quantity 31 and partial feature quantities 32, respectively, into the storage means 2.

The region dividing means 3, the partial feature quantity extracting means 4, the area sorting means 5, the area sorting means 6, the partial matching means 7, the whole feature quantity extracting means 8, the whole matching means 9, the deciding means 10, and the registering means 11 may be computers operated under a program. Moreover, the region dividing means 3, the partial feature quantity extracting means 4, the area sorting means 5, the area sorting means 6, the partial matching means 7, the whole feature quantity extracting means 8, the whole matching means 9, the deciding means 10 and the registering means 11 may be implemented by one computer operated by a program. The program is stored in a storage device in the computer, and the computer loads the program for operation.

Next, an operation will be described. In the following description, it is assumed that, when a region similar to a house exists in an image, the object region extracting apparatus extracts the region from the image. That is, the region similar to a house is assumed to be a region to be extracted. It is also assumed that the storage device 2 stores therein information on a plurality of objects of the house (e.g., whole feature quantities and partial feature quantities of objects obtained by imaging the same house from different angles). The storage means 2 stores therein the whole feature quantities of the whole house objects and partial feature quantities of parts of each house object.

The house object whose visual feature quantity is stored in the storage means 2 as the whole feature quantity 31 is denoted by $TO_j$, where j is a subscript representing a j-th house object. Moreover, the whole feature quantity of one whole house object $TO_j$ is denoted by $TOP_j$. When the number of kinds of the house objects is K, the storage means 2 stores therein their respective whole feature quantities $TOP_j$ (j=1 to K). The total number of parts is denoted by N, and each part is denoted by $TP_j$ (j=1 to N). The visual feature quantity of a part $TP_j$ is denoted by $FTP_j$. The storage means 2 stores therein partial feature quantities $FTP_j$ (j=1 to N).

Figure 3:
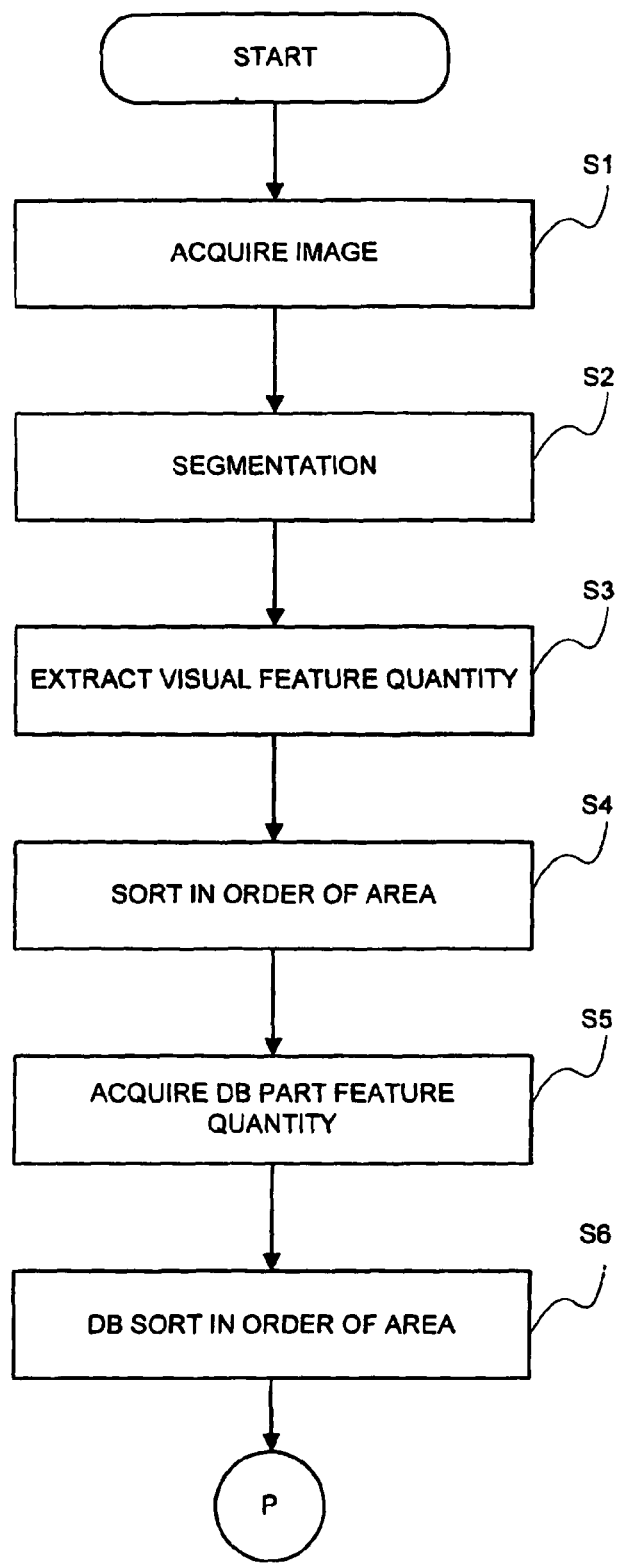
FIG. 3 A flow chart showing an exemplary operation of the object region extracting apparatus in accordance with the present invention.
Figure 4:
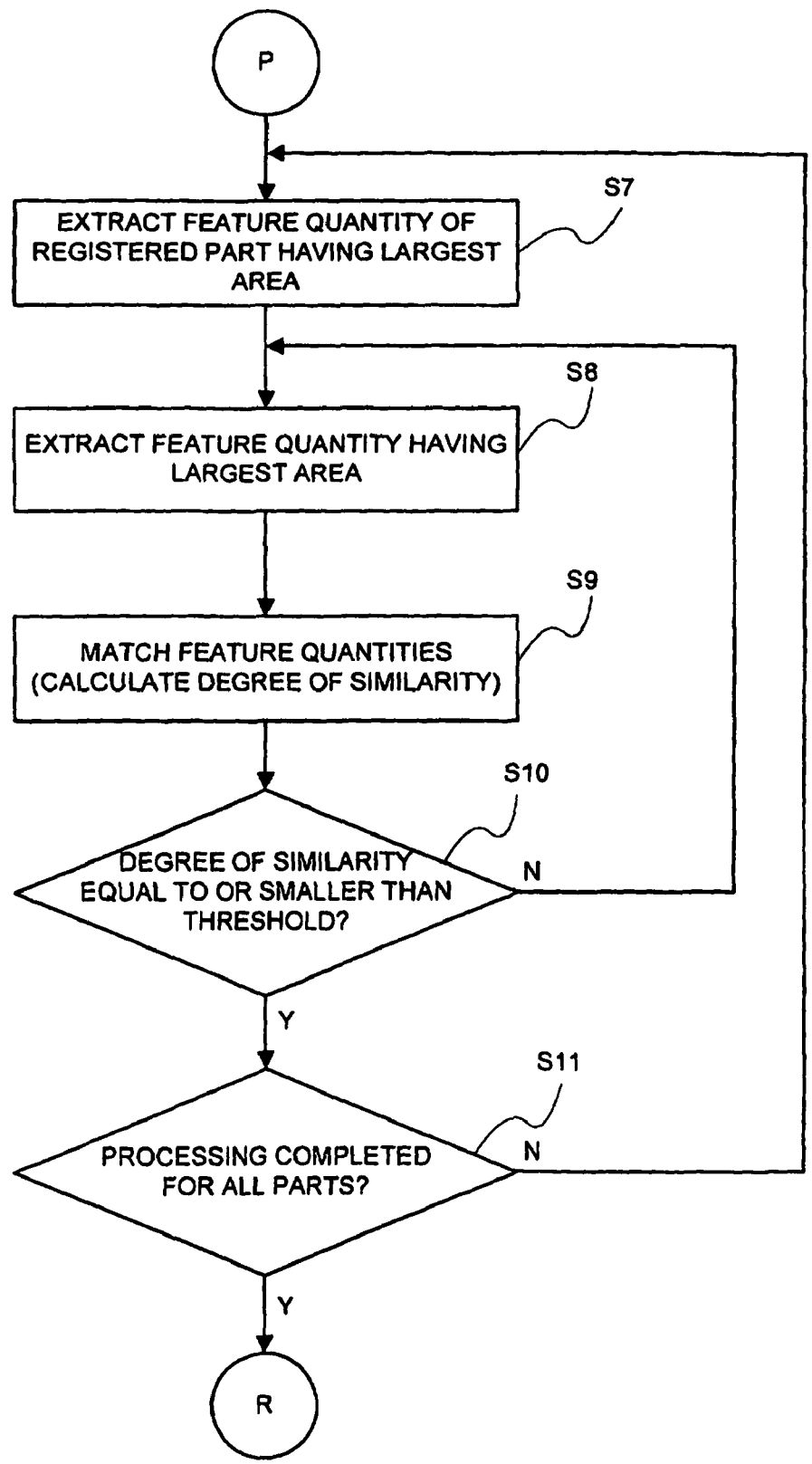
FIG. 4 A flow chart showing an exemplary operation of the object region extracting apparatus in accordance with the present invention.
Figure 5:
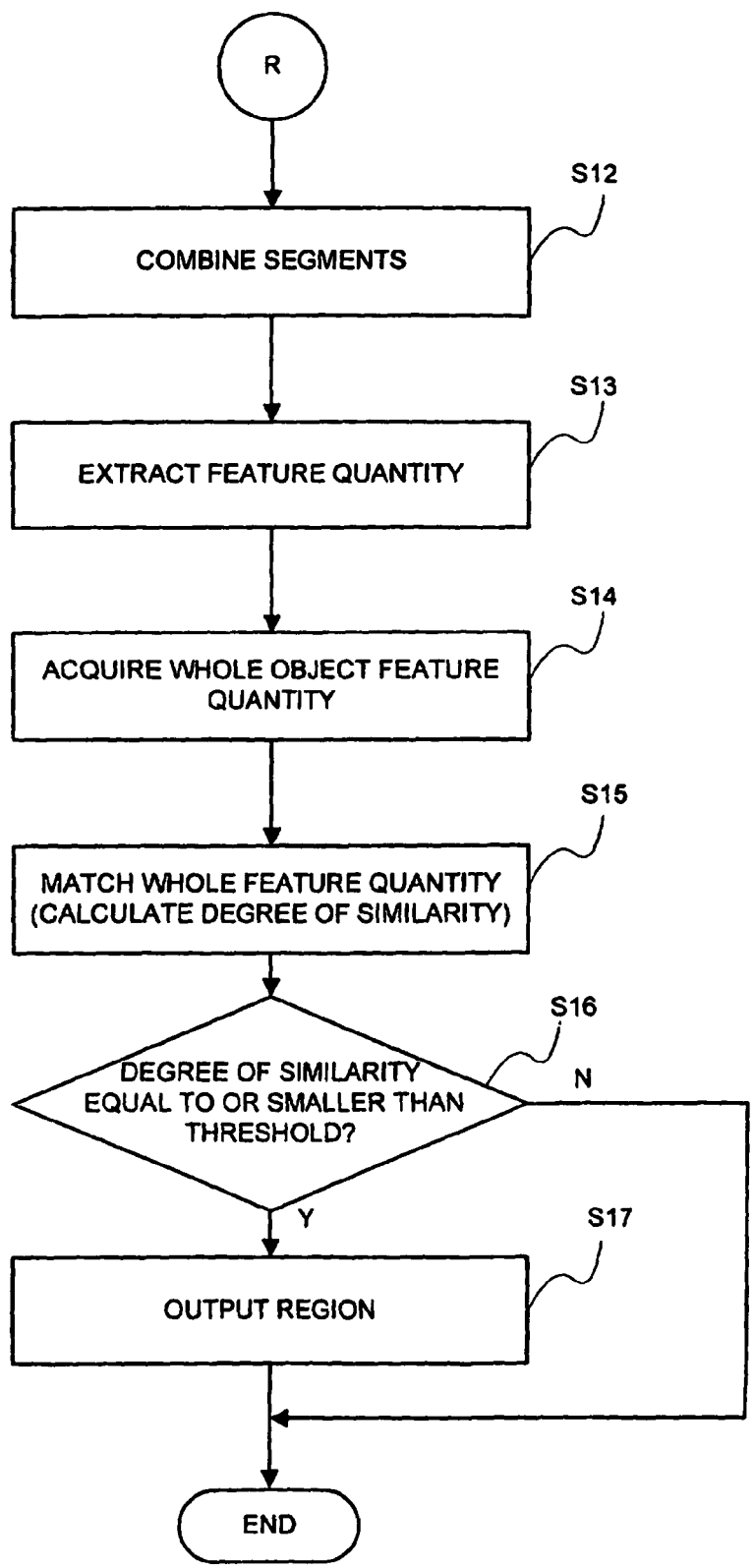
FIG. 5 A flow chart showing an exemplary operation of the object region extracting apparatus in accordance with the present invention.

FIGS. 3, 4 and 5 are flow charts showing an exemplary operation of the object region extracting apparatus in accordance with the present invention.

First, the image acquiring means 1 takes an image, and outputs the taken image to the region dividing means 3 (Step S1).

The region dividing means 3 subsequently applies segmentation to the image input by the image acquiring means 1 according to colors or edges (Step S2). For example, the region dividing means 3 divides the image with a border of color-coded regions, or with a border of an edge in the image. The division is translated into division of the input image by the region dividing means 3 into segments each having a similar visual feature. The region dividing means 3 may implement the segmentation by the method disclosed in Non-patent Document 2 (the segmentation method using complexity of colors, edges, or borders).

When the image is divided into p segments, each segment is denoted by $R_i$ (i=1 to p).

Figure 6:
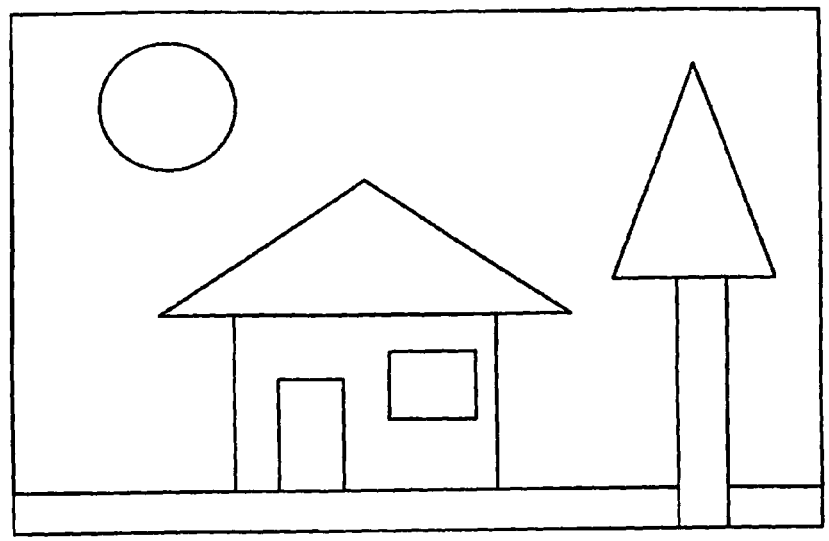
FIG. 6 An explanatory diagram showing an example of segmentation.
Figure 6:
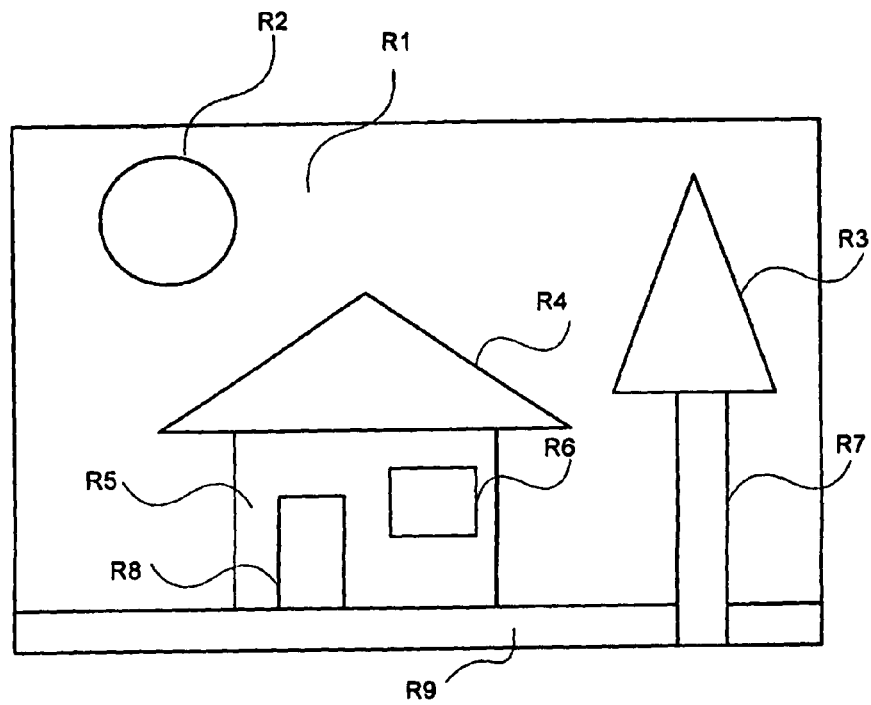

FIG. 6 is an explanatory diagram showing an example of segmentation. Assume that the image acquiring means 1 takes an image exemplarily shown in FIG. 6(*a*), and inputs the image shown in FIG. 6(*a*) into the region dividing means 3.

The region dividing means 3 may divide the image with a border of the color-coded regions, or with a border of an edge in the image. FIG. 6(b) represents the resulting segments Ri (i=1 to 9). The region dividing means 3 sends the segments obtained by the segmentation to the partial feature quantity extracting means 4 and the whole feature quantity extracting means 8.

The partial feature quantity extracting means 4 selects one segment, and extracts a visual feature quantity of the segment (Step S3). As described earlier, the visual feature quantities may include, for example, the feature quantity of color, feature quantity of a texture, feature quantity of a shape, feature quantity of a size (area), and feature quantity of a position.

The feature of color may include, for example, a feature of color according to a visual descriptor as defined by MPEG-7/Visual (dominant color or color layout). The partial feature quantity extracting means 4 may determine the feature quantity of color by the method disclosed in Non-patent Document 3. For example, RGB values of the most dominant color (values in a range of 0 to 225) in the selected segment may be extracted and defined as the feature quantity of color.

The feature of a texture may include, for example, a feature of a texture according to a visual descriptor as defined by MPEG-7/Visual (an edge histogram). The partial feature quantity extracting means 4 may determine the feature quantity of a texture by the method disclosed in Non-patent Document 3. For example, how much a vertical component, a horizontal component, an oblique component, and other components are included in the selected segment may be represented by numeric values and the values may be defined as the feature quantity of a texture.

The feature of a shape may include, for example, a feature of a shape according to a visual descriptor as defined by MPEG-7/Visual (a region-based shape descriptor). The partial feature quantity extracting means 4 may determine the feature quantity of a shape by the method disclosed in Non-patent Document 4. For example, the feature quantity of a shape may be determined as follows: The partial feature quantity extracting means 4 calculates a horizontal width of the selected segment from an upper portion to a lower portion of the segment. Specifically, a horizontal width of the upper portion of the segment is determined, a horizontal width of the segment at a position slightly lowered in the vertical direction is then determined, and such a process is repeated thereafter. Likewise, the partial feature quantity extracting means 4 calculates a vertical height of the selected segment from the left side to the right side of the segment. Specifically, a vertical height of the left side of the segment is determined, a vertical height of the segment at a position slightly shifted in the right direction is then determined, and such a process is repeated thereafter.

The feature of a size may include, for example, the number of picture elements (pixels) contained in the selected segment. The partial feature quantity extracting means 4 may extract the number of pixels contained in the selected segment as the feature quantity of a size.

The feature of a position may include, for example, the coordinate values of the upper left corner or lower right corner of a rectangular circumscribed around the selected segment. The partial feature quantity extracting means 4 may extract the coordinate values of the upper left corner or lower right corner of a rectangular circumscribed around the selected segment as the feature quantity of a position.

The partial feature quantity extracting means 4 may extract part or all of the feature quantity of color, a texture, a shape, a size, and a position of a segment, or may extract the feature quantities of other elements. Moreover, at Step S3, the partial feature quantity extracting means 4 determines part or all of the feature quantity of color, a texture, a shape, a size, and a position as elements in a vector so that the visual feature quantities are represented as a vector. The elements of the vector may include the feature quantities of elements other than color, a texture or a shape. Representing a visual feature quantity of a segment Ri as FRi, the partial feature quantity extracting means 4 may determine the visual feature quantities of the segment Ri as, for example, a vector of FRi=(a dominant color, a color layout, an edge histogram, a region-based shape descriptor, and so on).

The partial feature quantity extracting means 4 determines the visual feature quantities FRi as a vector containing at least one of the feature quantity of color, the feature quantity of a texture, the feature quantity of a shape, the feature quantity of a size, and the feature quantity of a position (or at least one of the feature quantity of color, the feature quantity of a texture, the feature quantity of a size, and the feature quantity of a position).

The storage means 2 also stores therein the visual feature quantities (whole feature quantity 31 and partial feature quantities 32) as a vector as described above.

After Step S3, the area sorting means 5 reads the visual feature quantities FRi of the segments Ri from the partial feature quantity extracting means 4, sorts the visual feature quantities FRi in a descending order of area, and records the result (Step S4).

After Step S4, the area sorting means 6 reads the visual feature quantities (partial feature quantities 32) of the parts constituting one object from the storage means 2 (Step S5).

For example, the area sorting means 6 reads the feature quantities relating to an area, color, and a texture of a plurality of parts constituting one object, sorts them in a descending order of area using the feature quantity relating to a area, and records the result (Step S6).

The partial matching means 7 acquires a visual feature quantity FPi of a part (indicated by Pi) having the largest area from the result sorted in order of area at Step S6 (Step S7).

Next, the partial matching means 7 acquires a visual feature quantity FRj of a segment (indicated by Rj) having the largest area from the result sorted in order of area at Step S4 (Step S8).

Figure 7:
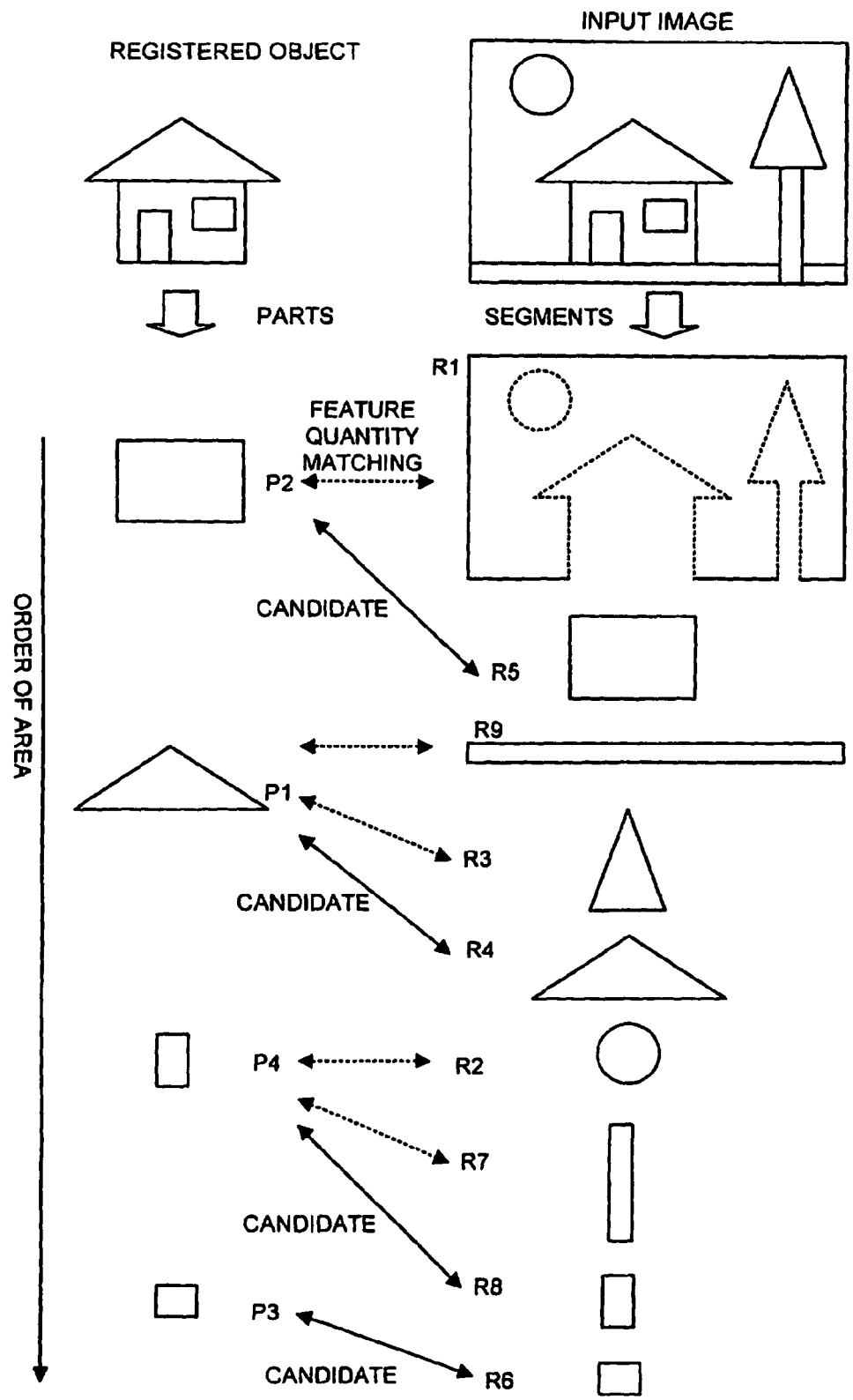
FIG. 7 An explanatory diagram showing an example of processing of searching for a segment to be defined as a candidate of a part region in order of area.

FIG. 7 is an explanatory diagram showing an exemplary operation of searching for a segment serving as a candidate of a part region in order of area. FIG. 7 exemplarily shows a case in which sorting has been made to result in the order of parts P2, P1, P4, P3 at Step S6, and the order of segments R1, R5, R9, R3, R4, R2, R7, R8, R6 at Step S4. In the example shown in FIG. 7, a part having the largest area part is P2, and a segment having the largest area is R1. In this case, the partial matching means 7 acquires a visual feature quantity FP2 of the part P2 having the largest area at Step S7, and acquires a visual feature quantity FR1 of the segment R1 having the largest area at Step S8.

The partial matching means 7 calculates a degree of similarity between the visual feature quantity FPj acquired at Step S7 and the visual feature quantity FRj acquired at Step S8 (Step S9). The degree of similarity between the visual feature quantity FPi of a part Pi and the visual feature quantity FRj of a segment Rj is represented as Sij.

The degree of similarity Sij can be represented by a distance between visual features. That is, a square root of a square sum of the difference between numeric values representing respective features can be represented as the degree of similarity (distance between the features). For example, assume that for the feature of color, a certain feature of color A is represented by (R=1, G=4, B=2), and another feature of color B is represented by (R=5, G=2, B=0). In this case, the degree of similarity between the visual features (that of the features of color in this example) is obtained by calculating a square root of a square sum of the difference in the R, G and B values. That is, the degree of similarity can be calculated as follows:

$$\sqrt{((1-5)^2+(4-2)^2+(2-0)^2}=\sqrt{24}=4.9,$$

where an operator "^" represents a power.

While a case in which the visual feature is the feature of color is shown here, a square root of a square sum of the difference of numeric values representing respective features may be calculated as the degree of similarity also in other cases.

In Step S9, the partial matching means 7 can determine Sij by calculating a square root of a square sum of the difference of numeric values representing respective features. The thus-obtained degree of similarity Sij represents higher similarity by its smaller value.

Subsequently, the partial matching means 7 decides whether the degree of similarity Sij determined at Step S9 is equal to or smaller than a predetermined threshold (denoted as Th1) or not (Step S10). If Sij is equal to or smaller than the threshold Th1, similarity determined between the two visual feature quantities is higher than a standard. If Sij has a larger value than the threshold Th1, similarity is lower than a standard.

The threshold Th1 may be determined as follows, for example. The degree of similarity between visual feature quantities is calculated for all combinations of the visual feature quantities of the parts stored in the storage means 2, and an average or maximum of the degree of similarity may be determined as the threshold. When a degree of similarity between the visual feature quantities stored in the storage means 2 is calculated for all combinations of the visual feature quantities of the parts stored in the storage means 2 and a maximum thereof is defined as the threshold Th1, a decision criterion of the level of similarity is lowered.

If the degree of similarity Sij is equal to or smaller than the threshold Th1 (Step S10, Y), the partial matching means 7 decides that the segment selected at Step S8 is a candidate of a part region, and the flow goes to Step S11.

If the degree of similarity Sij is greater than the threshold Th1 (Step S10, N), the flow goes back to Step S8 to search for a candidate segment corresponding to the part, and extraction of the feature quantity of a segment having the next largest area is repeated.

At Step 11, the partial matching means 7 decides whether or not matching (calculation of the degree of similarity) is completed between the visual feature quantity of the segment selected at Step S8 and the visual feature quantities of all parts acquired at Step S5. If matching is not completed for the visual feature quantities of all parts acquired at Step S5 (Step S11, N), the flow goes back to Step S7 to repeat the processing of Step S7 and thereafter. If matching is completed for the visual feature quantities of all parts acquired at Step S5 (Step S11, Y), the flow goes to Step S12.

Now a case in which a degree of similarity S21 between a visual feature quantity FP2 of a part P2 and a visual feature quantity FR1 of a segment R1 is calculated at Step S9, for example, will be addressed below. If the degree of similarity S21 is greater than a threshold Th1 (Step S10, N), the flow goes back to Step S8, and a visual feature quantity FR5 of a segment R5 having the largest area next to R1 is extracted.

Subsequently, a degree of similarity S25 between the visual feature quantity FP2 of the part P2 and the visual feature quantity FR5 of the segment R5 is calculated at Step S9. That is, matching of P2 with R5 is made. For example, if the degree of similarity S25 is equal to or smaller than the threshold Th1 at Step S10 (Step S10, Y), the flow goes to Step S11.

At Step S11, if the processing is not completed for all parts, the flow goes back to Step S7 to select a part P1 having the largest area next to the part P2, and the visual feature quantity FP1 is acquired. Moreover, at Step S8, a visual feature quantity FR9 of a segment R9 having the largest area next to the segment R5 is extracted. The partial matching means 7 makes decision of the degree of similarity between the visual feature quantities FP1 and FR9 at Step S9. Until a segment that is similar to a part P3 is extracted, the processing from Step S7 through Step S11 is repeated. The partial matching means 5 extracts sets of candidate segments for all parts, and sends the result to the whole feature quantity extracting means 8.

In extracting a certain object, representing the number of segments as m, matching between the feature quantities with sorting in order of area results in the number of runs of the matching processing at Step S9 being m. In a case that no sorting in order of area is made, and representing the number of parts registered in the dictionary as v, the number of runs of the matching processing is vm. Therefore, the processing load of deciding the degree of similarity between the visual feature quantity of a part and the visual feature quantity of a segment can be reduced.

Moreover, matching may be iteratively made until the total area of the selected parts reaches or exceeds a certain proportion, rather than using all parts. Since selection of a part is made in a descending order of area, matching processing may be terminated once the total region of the selected parts has reached or exceeded a certain proportion (e.g., 80%) of the whole object. Since the remaining parts may be considered to have a smaller effect on entire matching because of their smaller area; the processing may be omitted to reduce the computational cost.

FIG. 8 is an explanatory diagram showing exemplary candidate segments each defined as a candidate of a part region. The following description will be made assuming that, when the flow goes to Step S12, decision has been made by the preceding processing executed at Step S10 that R5, R4, R8, R6 exemplarily shown in FIG. 8 are candidates of part regions, and information on the candidate segments have been sent from the partial matching means 7 to the whole feature quantity extracting means 8.

The whole feature quantity extracting means 8 combines the candidate segments that are decided to be candidates of part regions to produce a combined region (Step S12). The whole feature quantity extracting means 8 is supplied with the segments from the region dividing means 3. Moreover, information indicating the candidate segments defined to be candidates of part regions (information indicating the segments R5, R4, R8, R6 in this example) is supplied thereto from the partial matching means 7. Therefore, the whole feature quantity extracting means 8 can combine the segments indicated by the information supplied by the region dividing means 3 to produce a combined region. That is, the whole feature quantity extracting means 8 produces, as a combined region, an image before segmentation constituted by all the candidate segments.

Since in Step S12, the number of combinations of segments is one, the number of runs of processing of determining the degree of similarity between the feature quantity of the combined region and the feature quantity of the whole object at Step S15 is one.

The whole feature quantity extracting means 8 extracts the visual feature quantity of the combined region produced at Step S12 (Step 13). The extraction of the visual feature quantity at Step S13 may be achieved in a similar way to that executed by the partial feature quantity extracting means 4 at Step S3. At Step S13, a feature quantity relating to color, a feature quantity relating to a texture, and a feature quantity relating to a shape are calculated, and these feature quantities may be used to perform calculation of the degree of similarity processing at Step S15. At that time, the degree-of-similarity calculation performed at Step S15 may be achieved by calculating at least one of a feature quantity relating to color, a feature quantity relating to a texture, a feature quantity relating to a shape and using that feature quantity. The calculation of the degree of similarity performed by calculating at least one of a feature quantity relating to color, a feature quantity relating to a texture, a feature quantity relating to a shape and using that feature quantity is a preferred example, and the mode of calculation of the degree of similarity is not limited to such one. After calculating the visual feature quantity of the combined region, the whole feature quantity extracting means 8 outputs the visual feature quantity to the whole matching means 9.

At Step S14, the whole matching means 9 reads a visual feature quantity (whole feature quantity) of one whole house object from the storage means 2 (Step S14). The visual feature quantity of the one whole house object read by the whole matching means 9 at Step S14 will be denoted as TOPj.

The whole matching means 9 calculates a degree of similarity between the visual feature quantity of the combined region supplied by the whole feature quantity extracting means 8 and the visual feature quantity of the one whole house object read from the storage means 2 at Step S14 (Step S15). The calculation of the degree of similarity at Step S15 may be achieved in a similar way to that at Step S9. That is, a square root of a square sum of the difference of respective features can be calculated between the visual feature quantity of the combined region and the visual feature quantity of the one whole house object read from the storage means 2. The whole matching means 9 then outputs the calculated degree of similarity to the deciding means 10.

Now consider the number of runs of matching processing in Non-patent Document 1. In Non-patent Document 1, the number of candidate segments is represented by d, and the number of parts registered in a dictionary is represented by v. Assuming that an object exists in an input image, then, there exist parts of the object and segments similar to the parts in the input image, and therefore, the number of candidate segments d is larger than the number of parts v:

$$d > v.$$

Since not all segments in the input image are candidate segments, the following inequality holds:

$$m > d.$$

In this case, the number of runs of matching processing in Non-patent Document 1 is dCv because it represents the number of combinations of candidate segments d.

In an ordinary image, the number of segments m is of the order of 50. Moreover, it is contemplated that the number of parts v in an object is four or more, and the number of candidate segments d is more than about twice the number of parts v. Then, substituting:

$$d = \alpha v (\alpha \geq 2),$$

dCv can be calculated as given below, which gives a monotonically increasing coefficient for the number of parts v:

$$_dC_v = \frac{d!}{(d-v)!v!} = \frac{\alpha v \cdot (\alpha v - 1) \cdot (\alpha v - 2) \ldots ((\alpha-1)v+1)}{v \cdot (v-1) \ldots 2} \quad [\text{Eq. 1}]$$

For example, assume that v=4, then dCv=70. Since m is of the order of 50, dCv>>m when v≧4.

Therefore, in the scheme disclosed in Non-patent Document 1, the number of runs of processing of determining a degree of similarity between the feature quantity of a combined region and the feature quantity of the whole object increases as the number of parts increases, whereas according to this embodiment, the number of runs of the matching processing at Step S15 is one, thus reducing the processing load.

The deciding means 10 decides whether or not the degree of similarity supplied by the whole matching means 9 is equal to or smaller than a predetermined threshold (Step S16). The threshold used in Step S16 is represented as Th2.

The threshold Th2 used at Step S16 may be determined using the average and variance of the degree of similarity in the combinations of the visual feature quantities (whole feature quantities) for the whole objects stored in the storage means 2. For example, the threshold Th2 may be determined as follows:

$$Th2 = \text{Coefficient } A \times L + \text{Coefficient } B \times SQRT(D),$$

wherein an average of the degree of similarity in the combinations of the visual feature quantities (whole feature quantities) for the whole objects is represented by L, and a variance thereof is represented by D.

That is, the sum of the average and the positive value of the square root of the variance of the degree of similarity multiplied by respective coefficients is defined as a threshold Th2. The positive value of the square root of the variance "SQRT (D)" is a standard deviation of the degree of similarity. Therefore, the threshold Th2 may also be regarded as being determined using the average and standard deviation of the degree of similarity. The similarity between the whole objects is believed to have some statistic deviation as compared to the similarity between parts. Therefore, by determining the threshold using the average and variance (or standard deviation) of the degree of similarity, a threshold can be determined to serve as an appropriate criterion.

If the degree of similarity supplied by the whole matching means 9 is equal to or smaller than the threshold Th2 (Step S16, Y), for example, the whole matching means 9 defines the combination (combined region) identified at Step S12 as a region similar to the specific object, and outputs (displays) the combined region on output means such as a display device (not shown in FIG. 1) (Step S17). At that time, the name of the object may also be output to the output means. In this example, the operation that a region similar to a house is to be extracted is previously determined, and accordingly, the name "house" is stored in the storage means 2 beforehand, and the name may be output to (displayed on) the output means along with the region.

If the degree of similarity supplied by the whole matching means 9 has a larger value than the threshold Th2 (Step S16, N), a region similar to the specific object is considered not to fall within the input image, and the processing is terminated.

This embodiment addresses a case in which, when a region similar to a house exists in an image, the object region extracting apparatus identifies the region in the image. When an object other than a house is desired to be processed in a similar method, the processing after Step S5 may be similarly applied to the object. When a plurality of kinds of objects is to be recognized, whole feature quantity 31 and partial feature quantities 32 are stored in the storage means 2 for each object, and individual whole feature quantities and partial feature quantities stored in the storage means 2 are made identifiable so that which object the feature quantity belongs to can be known. For example, a whole feature quantity and partial feature quantities of a house are assigned with identification information indicating a feature quantity relating to a house; and a whole feature quantity and partial feature quantities of a "tree" are assigned with identification information indicating a feature quantity relating to a "tree."

The present invention utilizes a fact that a sorted order of segments constituting one object is determined as a general sequence according to the object. For example, considering an object of a house, a wall region should be generally larger than a roof, a door or a window. Thus, in principle, a sequence of segments, such as a wall, a roof, a door, a window or the like is determined by the object. Moreover, it is contemplated that the areas of parts stored in the storage means 2 and the areas of segments in an input image are likely to be sorted following a general order of area. Therefore, as described above, a visual feature quantity of a part and that of a segment may be matched in a simple scheme to extract a candidate segment with general accuracy. Moreover, even when the area of a part is not similar to that of a segment (e.g., in a case that a segment is an enlargement of a part), a candidate segment can be nevertheless extracted when the sorted order of the parts is the same as that of the segments in an object.

There may be a special case that a door is sometimes larger than a window and a window is larger than a door at other times for the same house object. In such a case, it is possible that a segment of the door or window cannot be extracted. However, by sorting in a descending order of area, portions of the object that constitute a larger area, such as, for example, a region of a wall or of a roof is extracted, and thus, a region nearly resembling the object desired to be extracted can be detected.

Moreover, two different input images containing the same object may provide different results of sorting when the area of background or other objects is different. However, the order of sorting of the segments constituting one object is kept constant regardless of the area of other objects. For example, in a case of an input image having the area of a moon object (segment) R2 in the background smaller than the area of the segment R6, a result of sorting at Step S4 gives a sequence of R1, R5, R9, R3, R4, R7, R8, R6, R2. However, considering only segments R4, R5, R6, R8 that constitute a house object, for example, the order of area for the segments R4, R5, R6, R8 gives a sequence of R5, R4, R8, R6 regardless of the area of the segment R2, which is constant. Therefore, even when the background or other objects are different between input images, candidate segments can be extracted with general accuracy.

Next, an operation of storing the whole feature quantity 31 and partial feature quantities 32 into the storage means 2 will be described. When storing the whole feature quantity 31 and the partial feature quantities 32 into the storage means 2, an image of a whole object is first input to the image acquiring means 1. For example, when a region similar to a house exists in an image and that region is to be extracted from the image, the image of the whole "house" is input to the image acquiring means 1.

The whole feature quantity extracting means 8 extracts the visual feature quantity of the image (whole object) input to the image acquiring means 1. This processing may be achieved as in Step S14. The whole feature quantity extracting means 8 then stores the extracted visual feature quantity to the storage means 2 as the whole feature quantity of the whole object.

The region dividing means 3 divides the whole object in the image input to the image acquiring means 1 into segments. This processing may be achieved as in Step S2. Specifically, the region dividing means 3 divides the whole object into a plurality of segments by color or edge.

The partial feature quantity extracting means 4 extracts a visual feature quantity for each divided segment (part). This processing may be achieved as in Step S3. The partial feature quantity extracting means 4 then stores the visual feature quantity of each segment as a partial feature quantity into the storage means 2.

Alternatively, after dividing the input image into segments, an operator may be prompted to select parts (segments) constituting a whole object from among the segments. In this case, an image containing the whole object is input to the image acquiring means 1 (or alternatively, an image containing the whole object is taken by the image acquiring means 1). The image dividing means 3 is supplied with the image from the image acquiring means 1. The image dividing means 3 then performs segmentation on the input image as in Step S2. Moreover, the image dividing means 3 displays the segments on the output means such as a display device (not shown), and prompts the operator to select segments constituting the whole object.

Once the operator has selected segments constituting the whole object, the whole feature quantity extracting means 8 produces a combined region of the selected segments, and extracts the visual feature quantity of the combined region as in Step S13. The whole feature quantity extracting means 8 then stores the visual feature quantity into the storage means 2 as the whole feature quantity.

The partial feature quantity extracting means 4 extracts visual feature quantities of the individual segments selected by the operator, respectively, as in Step S3, and stores the extracted visual feature quantities into the storage means 2 as the partial feature quantities.

While the preceding description exemplarily addresses a case in which the whole feature quantity extracting means 8 and partial feature quantity extracting means 4 store the whole feature quantity 31 and the partial feature quantities 32 into the storage means 2, the registering means 11, for example, may store the whole feature quantity 31 and the partial feature quantities 32 into the storage means 2.

Assume that the storage means 2 stores therein the whole feature quantity 31 and the partial feature quantities 32 beforehand. The object region extracting apparatus inputs an image containing a house object as a part thereof into the image acquiring means 1, and performs extraction of a house object region. The deciding means 10 outputs the visual feature quantity of the combined region extracted by the whole feature quantity extracting means 8 and the visual feature quantity of candidate segments matched by the partial matching means 7 into the registering means 11 as the whole feature quantity 31 and partial feature quantities 32. The registering means 11 can then register the output whole feature quantity 31 and partial feature quantities 32 into the storage means 2.

As described above, according to the aforementioned embodiment, the storage means stores therein the visual feature quantity of a whole object and visual features of parts obtained by dividing the object into sub-regions each having a similar visual feature. An input image is divided by color or an edge, and the feature quantity of each segment is extracted. If the visual feature quantity of a combination of the segments is similar to the stored visual feature quantity of the whole object, the combined region is defined as a region similar to the object. Therefore, even for an image in which the presence of a specific object is unknown, if any region similar to the object exists in the image, a region similar to the object can be extracted.

Moreover, according to the aforementioned embodiment, the visual feature quantities of the stored parts of the object and the visual feature quantities of the segments are individually sorted in order of area, and matching of the feature quantities in a descending order of area is performed to extract a candidate segment that is similar to a part. Therefore, the number of runs of processing of determining the degree of similarity between the visual feature quantity of parts and the visual feature quantity of segments can be reduced. The extracted candidate segments are combined to produce one combined region, and the degree of similarity between the feature quantity of the combined region and the feature quantity of the whole object can be calculated to thereby reduce the number of runs of the processing of determining the degree of similarity between the feature quantity of the combined region and the feature quantity of the whole object.

The present invention can be effectively applied for extracting a region similar to a specific object from an input image.

The present application claims priority based on Japanese Patent Application No. 2006-187821, filed on Jul. 7, 2006, disclosure of which is incorporated herein in its entirety.

The invention claimed is:

1. An object region extracting apparatus wherein the apparatus comprises:
storage means for storing a visual feature quantity of a whole region of a specific object, and a visual feature quantity of each of partial regions obtained by dividing said object so that each partial region has a similar visual feature;
region dividing means for dividing an input image into segments each having a similar visual feature;
partial feature quantity extracting means for extracting a visual feature quantity of each of said divided segments;
partial matching means for calculating a degree of similarity between the visual feature quantity of said partial region and the visual feature quantity of said segment, performing partial matching processing that decides whether or not the calculated degree of similarity has a predetermined relationship with a first threshold, and when they have the predetermined relationship, defining said segment as a candidate segment constituting a portion of the specific object;
whole feature quantity extracting means for producing a combined region constituted by combining the candidate segments, and extracting a visual feature quantity of the produced combined region; and
whole matching means for calculating a degree of similarity between the visual feature quantity of said whole region and the visual feature quantity of said combined region, and deciding that said combined region comprises a region similar to the specific object when the calculated degree of similarity and a second threshold fulfill a predetermined relationship,
wherein said partial matching means performs said partial matching processing by selecting a visual feature quantity of each of said partial regions and said segments in a descending order of an area thereof, which are acquired along with the visual feature quantity, and selecting a visual feature quantity of a partial region having a next smaller area and a visual feature quantity of a segment having a next smaller area when said candidate segment is detected.

2. An object region extracting apparatus according to claim 1, wherein:
said partial matching means uses at least one of a feature quantity relating to color, a feature quantity relating to a texture, a feature quantity relating to a size, and a feature quantity relating to a position to calculate a degree of similarity between the visual feature quantity of the partial region stored in the storage means and the visual feature quantity extracted by the partial feature quantity extracting means.

3. An object region extracting apparatus according to claim 1 wherein:
said whole matching means uses at least one of a feature quantity relating to color, a feature quantity relating to a texture, a feature quantity relating to a shape, a feature quantity relating to a size, and a feature quantity relating to a position to calculate a degree of similarity between the visual feature quantity of the whole region stored in the storage means and the visual feature quantity extracted by the whole feature quantity extracting means.

4. An object region extracting apparatus according to claim 1, wherein the apparatus further comprises:
registering means for registering the visual feature quantity of the combined region extracted by the whole feature quantity extracting means into the storage means as a visual feature quantity of the whole region of the object, and registering the visual feature quantity of the candidate segment matched by the partial matching means into the storage means as a visual feature quantity of each partial region.

5. An object region extracting method of extracting a region similar to a specific object from an input image using a visual feature quantity of a whole region of the specific object, and a visual feature quantity of each of partial regions obtained by dividing said object so that each partial region has a similar visual feature, which is stored in storage means, wherein the method comprises:
dividing the input image into segments each having a similar visual feature;
extracting a visual feature quantity of each of the divided segments;
calculating a degree of similarity between the visual feature quantity of said partial region and the visual feature quantity of said segment by selecting a visual feature quantity of each of said partial regions and said segments in a descending order of an area thereof, which are acquired along with the visual feature quantity, and selecting a visual feature quantity of a partial region having a next smaller area and a visual feature quantity of a segment having a next smaller area when said candidate segment is detected;
deciding whether or not the calculated degree of similarity has a predetermined relationship with a first threshold, and when they have the predetermined relationship, defining said segment as a candidate segment constituting a portion of the specific object;
producing a combined region constituted by combining the candidate segments, and extracting a visual feature quantity of the produced combined region; and
calculating a degree of similarity between the visual feature quantity of said whole region and the visual feature quantity of said combined region, and deciding that said combined region comprises a region similar to the specific object when the calculated degree of similarity and a second threshold fulfill a predetermined relationship.

6. An object region extracting method according to claim 5, wherein the method further comprises:
calculating a degree of similarity between the visual feature quantity of the partial region and the extracted visual feature quantity using at least one of a feature quantity relating to color, a feature quantity relating to a texture, a feature quantity relating to a size, and a feature quantity relating to a position.

7. An object region extracting method according to claim 5 wherein the method further comprises:
calculating a degree of similarity between the visual feature quantity of the whole region and the extracted visual feature quantity using at least one of a feature quantity relating to color, a feature quantity relating to a texture, a feature quantity relating to a shape, a feature quantity relating to a size, and a feature quantity relating to a position.

8. An object region extracting method according to claim 5, wherein the method further comprises:
registering the extracted visual feature quantity of the combined region into the storage means as a visual feature quantity of the whole region of the object, and registering the visual feature quantity of the matched candidate segment into the storage means as a visual feature quantity of each partial region.

9. A non-transitory computer readable storage medium storing an object region extracting program for extracting a region similar to a specific object from an input image using a visual feature quantity of a whole region of the specific object, and a visual feature quantity of each of partial regions obtained by dividing said object so that each partial region has a similar visual feature, wherein said object region extracting program causes a computer to execute:
region dividing processing for dividing the input image into segments each having a similar visual feature;
partial feature quantity extracting processing for extracting a visual feature quantity of each of the divided segments;
partial matching processing for calculating a degree of similarity between the visual feature quantity of said partial region and the visual feature quantity of said segment by selecting a visual feature quantity of each of said partial regions and said segments in a descending order of an area thereof, which are acquired along with the visual feature quantity, and selecting a visual feature quantity of a partial region having a next smaller area and a visual feature quantity of a segment having a next smaller area when said candidate segment is detected, deciding whether or not the calculated degree of similarity has a predetermined relationship with a first threshold, and when they have the predetermined relationship, defining said segment as a candidate segment constituting a portion of the specific object;
whole feature quantity extracting processing for producing a combined region constituted by combining the candidate segments, and extracting a visual feature quantity of the produced combined region; and
whole matching processing for calculating a degree of similarity between the visual feature quantity of said whole region and the visual feature quantity of said combined region, and deciding that said combined region comprises a region similar to the specific object when the calculated degree of similarity and a second threshold fulfill a predetermined relationship.

10. An object region extracting apparatus according to claim 2, wherein:
said whole matching means uses at least one of a feature quantity relating to color, a feature quantity relating to a texture, a feature quantity relating to a shape, a feature quantity relating to a size, and a feature quantity relating to a position to calculate a degree of similarity between the visual feature quantity of the whole region stored in the storage means and the visual feature quantity extracted by the whole feature quantity extracting means.

11. An object region extracting apparatus according to claim 2, wherein the apparatus further comprises:
registering means for registering the visual feature quantity of the combined region extracted by the whole feature quantity extracting means into the storage means as a visual feature quantity of the whole region of the object, and registering the visual feature quantity of the candidate segment matched by the partial matching means into the storage means as a visual feature quantity of each partial region.

12. An object region extracting apparatus according to claim 3, wherein the apparatus further comprises:
registering means for registering the visual feature quantity of the combined region extracted by the whole feature quantity extracting means into the storage means as a visual feature quantity of the whole region of the object, and registering the visual feature quantity of the candidate segment matched by the partial matching means into the storage means as a visual feature quantity of each partial region.

13. An object region extracting method according to claim 6, wherein the method further comprises:
calculating a degree of similarity between the visual feature quantity of the whole region and the extracted visual feature quantity using at least one of a feature quantity relating to color, a feature quantity relating to a texture, a feature quantity relating to a shape, a feature quantity relating to a size, and a feature quantity relating to a position.

14. An object region extracting method according to claim 6, wherein the method further comprises:
registering the extracted visual feature quantity of the combined region into the storage means as a visual feature quantity of the whole region of the object, and registering the visual feature quantity of the matched candidate segment into the storage means as a visual feature quantity of each partial region.

15. An object region extracting method according to claim 7, wherein the method further comprises:
registering the extracted visual feature quantity of the combined region into the storage means as a visual feature quantity of the whole region of the object, and registering the visual feature quantity of the matched candidate segment into the storage means as a visual feature quantity of each partial region.

\* \* \* \* \*